(12) United States Patent
Pucher

(10) Patent No.: US 8,887,771 B2
(45) Date of Patent: Nov. 18, 2014

(54) SYSTEM FOR SUPPLYING A CONSUMER WITH GASEOUS FUEL AND ASSOCIATED METHOD

(75) Inventor: Peter Pucher, Judenburg (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 1857 days.

(21) Appl. No.: 12/161,007

(22) PCT Filed: Jan. 16, 2007

(86) PCT No.: PCT/AT2007/000012
§ 371 (c)(1),
(2), (4) Date: Jun. 28, 2010

(87) PCT Pub. No.: WO2007/079517
PCT Pub. Date: Jul. 19, 2007

(65) Prior Publication Data
US 2010/0276027 A1   Nov. 4, 2010

(30) Foreign Application Priority Data

Jan. 16, 2006   (AT) .............................. GM20/2006 U

(51) Int. Cl.
| | |
|---|---|
| B65B 1/08 | (2006.01) |
| F04F 5/00 | (2006.01) |
| F02M 21/02 | (2006.01) |
| F02D 19/02 | (2006.01) |
| F02M 21/04 | (2006.01) |

(52) U.S. Cl.
CPC ....... F02M 21/0224 (2013.01); F02M 21/0236 (2013.01); *Y02T 10/32* (2013.01); F02M 21/0242 (2013.01); F02D 19/022 (2013.01); F02D 19/027 (2013.01); *F02M 21/047* (2013.01)

USPC .................. 141/67; 141/3; 141/47; 141/302; 137/565.22

(58) Field of Classification Search
CPC .......... F02M 21/0224; F02M 21/0236; F02M 21/0242; F02M 21/047; F02D 19/022; F02D 19/027; Y02T 10/32
USPC ................. 141/1, 47, 67, 311 R, 323, 3, 302; 137/565.22
See application file for complete search history.

(56) References Cited

U.S. PATENT DOCUMENTS

| | | | |
|---|---|---|---|
| 1,954,208 A | 3/1930 | Imbert | |
| 3,724,276 A * | 4/1973 | Schwind | 73/864.34 |

(Continued)

FOREIGN PATENT DOCUMENTS

| | | |
|---|---|---|
| GB | 1 208 162 A | 10/1970 |
| GB | 1 440 318 A | 6/1976 |
| WO | 88/01708 A1 | 3/1988 |

*Primary Examiner* — Timothy L Maust
(74) *Attorney, Agent, or Firm* — Bachman & LaPointe, P.C.

(57) ABSTRACT

The invention relates to a system for supplying a consumer with gaseous fuel. Said system comprises at least one compressed gas container, which is fluidically connected to the consumer via a collecting line and valves. To extensively utilise the capacity of the compressed gas container, a reserve container (3) is connected to the collecting line (12) via a first valve (9) and the system is equipped with an ejector pump (14), which is operated by gas from the reserve container (3) and delivers gas from the compressed gas container(s) (1, 2, . . . ) into the collecting line (12). To achieve this, with respect to the flow, the ejector pump (14) is situated between the compressed gas container(s) (1,2, . . . ) and the consumer (5).

13 Claims, 3 Drawing Sheets

(56) References Cited

U.S. PATENT DOCUMENTS

| | | | |
|---|---|---|---|
| 5,535,770 A * | 7/1996 | Nurmi | 137/14 |
| 5,884,664 A * | 3/1999 | Nagai et al. | 137/884 |
| 6,546,962 B1 * | 4/2003 | Sunde | 137/893 |
| 6,722,399 B1 | 4/2004 | Cano | |
| 7,037,609 B2 * | 5/2006 | Sugawara et al. | 429/415 |
| 8,029,939 B2 * | 10/2011 | Andreas-Schott et al. | 429/454 |
| 2002/0073972 A1 * | 6/2002 | Orsini et al. | 123/497 |
| 2009/0142631 A1 * | 6/2009 | Kah | 429/17 |

* cited by examiner

SYSTEM FOR SUPPLYING A CONSUMER WITH GASEOUS FUEL AND ASSOCIATED METHOD

BACKGROUND OF THE INVENTION

The invention relates to a system for supplying a consumer with gaseous fuel, with at least one compressed gas container which is connected in terms of flow to the consumer via a collecting line and valves. In most cases, the consumer is a gas-operated internal combustion engine of a motor vehicle. Since the gas is stored at a filling pressure of 200 bar or more, and for reasons concerned with accommodating it in the motor vehicle, use is frequently made of a plurality of containers of relatively small diameter, up to now gas cylinders of the commercially available type.

Such a system with two compressed gas containers is described, for example, in EP 761 951 B1, but this is primarily concerned with the control of the pressure in the consumer, which is not the subject matter of the present invention. The compressed gas containers can never be entirely emptied because of the pressure drop between the containers and the injection nozzles of the internal combustion engine. Their storage capacity is therefore only incompletely used. The compressed gas containers therefore have to be dimensioned for a capacity which is greater than the amount which can actually be used. Therefore, however, the range of the vehicle with a batch of containers is limited.

SUMMARY OF THE INVENTION

It is therefore the object of the invention to substantially use the capacity of the compressed gas containers and in addition also to make it easier to reach the next gas station.

According to the invention, this is achieved in that a reserve container is connected to the collecting line via a first valve, and in that an ejector pump is provided, the ejector pump being operated with gas from the reserve container and feeding gas from the at least one compressed gas container into the collecting line, for which purpose the ejector pump is arranged, with regard to the flow, between the at least one container and the consumer. The reserve container is not only a reserve in order to reach the next gas station. Its contents are initially used in order to suck out a further considerable residual amount from the largely emptied compressed gas containers. As a result, the reserve is used so to speak twice, as a fuel reserve and as an energy reserve. Thus, the ejector pump also makes use of its compressed energy which is "throttled" upon removal from the compressed gas containers. The reserve container therefore ultimately provides an amount of gas which may be around twice its capacity. Added to this, the ejector pumps also have a special advantage of not having movable parts and not requiring any external supply of energy.

A nonreturn valve is preferably arranged in the collecting line between the at least one compressed gas container and the location where the gas coming from the reserve container opens out, said nonreturn valve preventing flow from the reserve container to the at least one compressed gas container. It is then not possible for there to be any back flow out of the reserve container even if the flow in the ejector pump breaks off for whatever reason, for example clogging. FIG. 1, 2, 3.

Within the scope of the invention, various embodiments and variants are possible and, depending on the individual application, advantageous. In all of them, the ejector pump comprises a feed duct and a driving nozzle arranged therein. In a first embodiment, the collecting line in the ejector pump forms the feed duct, and the reserve container is connected in terms of flow to the driving nozzle FIG. 1, 3.

In a development of the first embodiment, the collecting line is branched at a point upstream of the ejector pump into two branches forming a loop, the first branch between the at least one compressed gas container and the ejector pump containing the nonreturn valve, and the second branch containing a second valve.

In a second embodiment, the collecting line has two branches, the first of which forms the feed duct in the ejector pump and the second of which opens into the driving nozzle, the first branch between the at least one compressed gas container and the ejector pump having a nonreturn valve and a second valve, and the compressed gas containers being connected between the nonreturn valve and the second valve to the collecting line. Whether the first or the second embodiment should be preferred depends on the pressure required by the consumer and on the design of the ejector pump.

In a third embodiment, a bypass line forms the feed duct of the ejector pump, and the reserve container is connected in terms of flow to the driving nozzle, the bypass line branching off at a first point of the collecting line between the at least one container and the nonreturn valve and being reunited with the collecting line at a second point located between the nonreturn valve and the consumer, and a further nonreturn valve being arranged between the first point and the ejector pump. In this embodiment, the flow does not pass through the ejector pump during normal operation.

A plurality of containers are preferably each connected in terms of flow to the collecting line, with a control valve which is designed as a cyclically operated valve and can be completely opened in a reserve position being present at the output of each container. The pressure in the collecting line can therefore be adjusted and, with the valve completely open, there is a smaller pressure drop in the reserve position, and therefore yet more residual gas can be sucked out of the compressed gas container.

In a development of the invention, the collecting line can be connected to an external compressed gas source via a refueling valve and contains a shut-off valve downstream of the ejector pump (and therefore of the location where the reserve opens out). As a result, during refueling, the reserve container is simultaneously filled by the at least one compressed gas container without there being feedback to the consumer.

The scope of the invention furthermore includes the fact that an emergency discharge line or a repair discharge line, which each contain their own shut-off valve, branches off from the collecting line, and that the valves are combined in a valve block which also contains at least part of the collecting line and, if appropriate, also the ejector pump.

However, the invention also relates to a method for removing gaseous fuel from at least one compressed gas container which is connected in terms of flow to the consumer via a collecting line and valves. The object according to the invention is achieved in that, when the pressure in the collecting line drops below a threshold value, gaseous fuel is removed from a reserve container and supplied to the collecting line via an ejector pump, with the at least one compressed gas container being largely emptied.

BRIEF DESCRIPTION OF THE DRAWINGS

The invention is described and explained below with reference to figures, in which.

DETAILED DESCRIPTION

Figure 1:
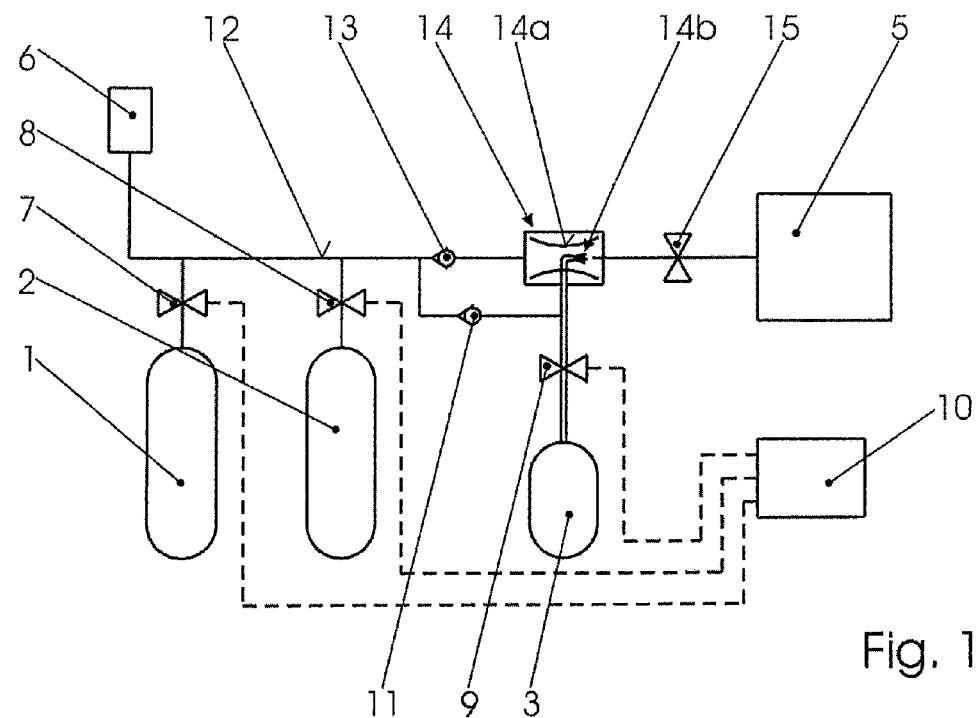
FIG. 1 shows a diagram of a first embodiment of the invention.

In FIG. 1, two compressed gas containers 1, 2 are intended for supplying a consumer 5 during normal operation. However, there could also be more than two compressed gas containers or just a single one. In addition and according to the invention, a reserve container 3 is provided, the volume of which can be smaller than that of the compressed gas containers 1, 2. The compressed gas containers 1, 2 and the reserve container 3 discharge their contents to the consumer 5 via valves 7, 8, 9 which are preferably cyclically controlled valves. They are activated from a control unit 10. In order to fill the system, for example in a motor vehicle at a gas station, a refueling valve 6 is provided. For easier filling of the reserve container, a bypass line can be provided with a nonreturn valve 11. The components mentioned are provided with the same reference numbers in all four exemplary embodiments.

In the first embodiment (FIG. 1), the compressed gas containers 1, 2 discharge their contents into a collecting line 12 which contains, in the direction of flow, first of all a nonreturn valve 13 and then an ejector pump 14. The ejector pump 14 essentially comprises a feed duct 14a and a driving nozzle 14b. In the ejector pump 14, the collecting line 12 forms the feed duct 14a and leads on via a locking-off valve 15 to the consumer 5. During normal operation, the valve 9 of the reserve container 3 is closed, and the compressed gas discharged by the compressed gas containers 1, 2 flows through the nonreturn valve 13, the ejector pump 14 and a locking-off valve 15 to the consumer 5.

When the compressed gas containers 1, 2 are emptied to such an extent that their pressure is no longer sufficient to overcome the flow resistances in the collecting line 12, the valve 9 is opened and compressed gas from the reserve container 3 flows into the driving nozzle 14b of the ejector pump 14. As a result, a negative pressure is generated in the collecting line 12 upstream of the ejector pump 14, said negative pressure opening the nonreturn valve 13 and removing a further residual amount, corresponding to the negative pressure generated, from the compressed gas containers 1, 2.

Figure 2:
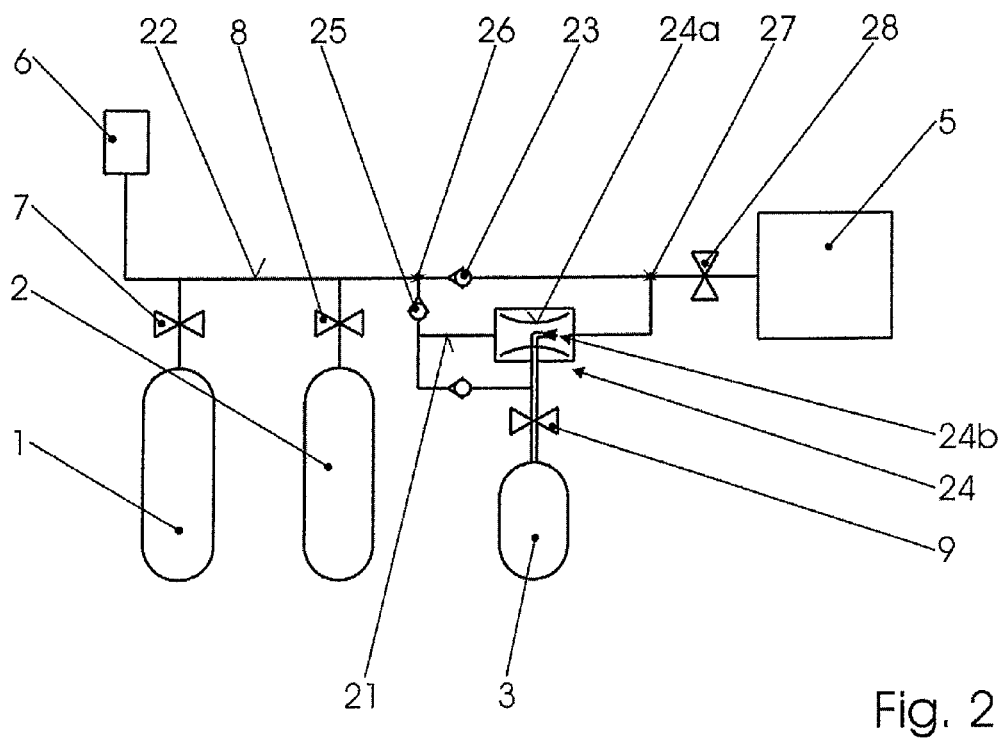
FIG. 2 shows a diagram of a second embodiment of the invention.

The embodiment of FIG. 2 differs from the preceding one in that the collecting line 22 has a bypass line 21. The latter branches off from the collecting line 22 at a first point 26 between the compressed gas containers 1, 2 and the nonreturn valve 23 and opens again into the collecting line 22 at a second point 27. The bypass line 21 first of all contains, in the direction of flow, a further nonreturn valve 25 and the ejector pump 24. In the ejector pump 24, the bypass line 21 again forms the feed duct 24a thereof. During normal operation, the nonreturn valve 23 is open, and, in the reserve mode, the further nonreturn valve 25 is open and the nonreturn valve 23 is closed.

Figure 3:
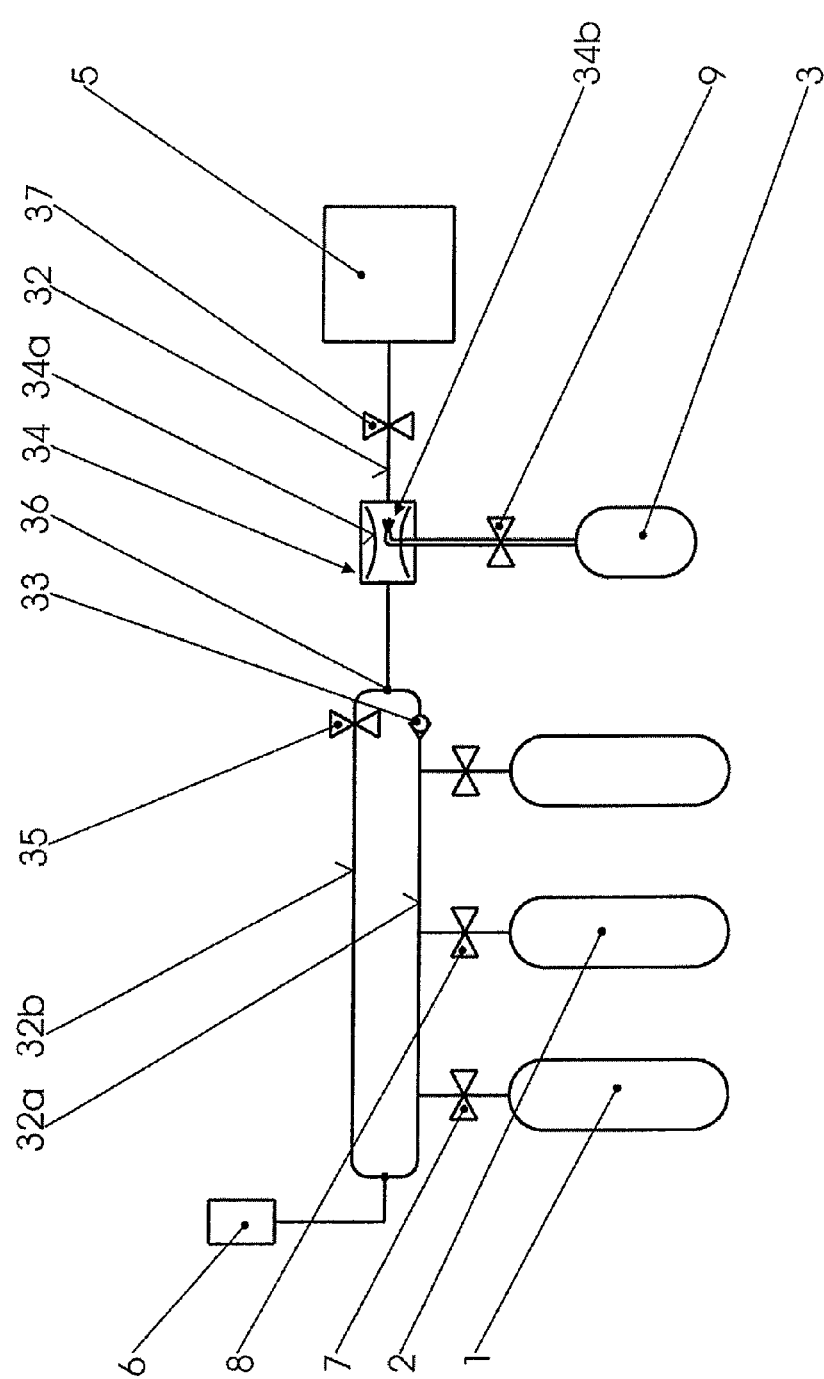
FIG. 3 shows a diagram of a third embodiment of the invention.

In the embodiment of FIG. 3, the collecting line 32 is branched upstream of the ejector pump 34 into a first branch 32a and a second branch 32b, the two branches forming a loop which is also connected to the refueling valve 6. The first branch 32a is connected to the compressed gas containers 1, 2 and leads via a nonreturn valve 33 to a branching point 36. The second branch 32b leads from the compressed gas containers 1, 2 via a switching-over valve 35 to the branching point 36. During normal operation, the compressed gas flows through the nonreturn valve 33 and through the non-operative ejector pump 34 and, in the collecting line 32 through a locking-off valve 28, to the consumer 5. In the reserve mode, the switching-over valve 35 is open. In this position, the ejector pump 34 sucks gas out of the compressed gas containers 1, 2 through the second branch 32b of the collecting line. Since a relatively small pressure prevails in the first branch 32a, the nonreturn valve 33 remains closed.

Figure 4:
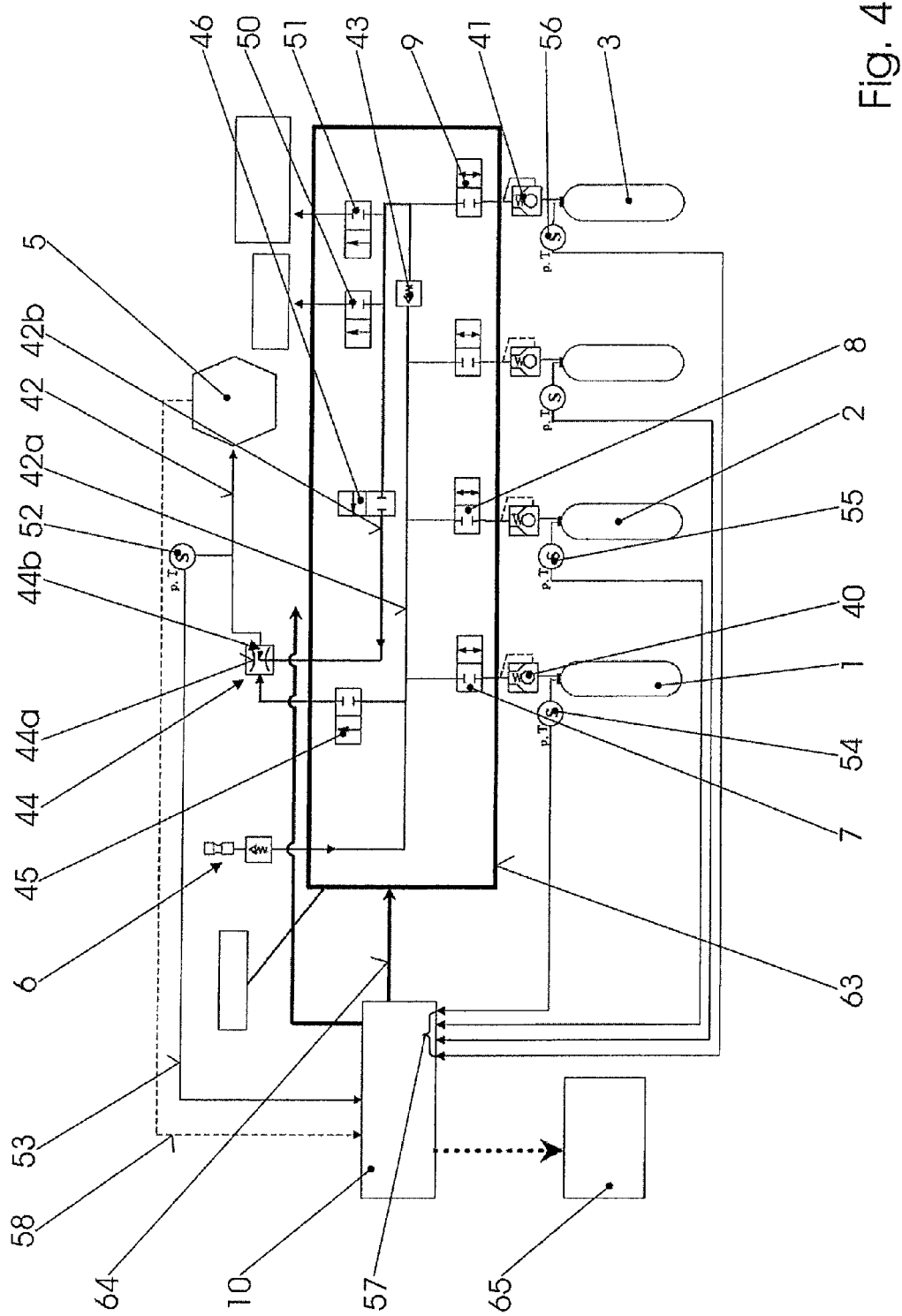
FIG. 4 shows a fourth embodiment of the invention.

The embodiment of FIG. 4 is illustrated somewhat more precisely than merely schematically. The compressed gas containers 1, 2 (and also a further one) are provided with "overflow valves" 40, 41 which close as a safety measure if there is an excessive pressure drop in the line (for example should a line fracture). The compressed gas containers 1, 2 and the reserve container 3 are furthermore connected to the collecting line 42 via the cyclically controlled valves 7, 8, 9. Said collecting line again comprises a first branch 42a and a second branch 42b. The first branch 42a connects the compressed gas containers 1, 2 via a second valve 45 to the ejector pump 44, into the feed duct 44a of which it opens out. The second branch 42b is connected via a nonreturn valve 43 to the first branch 42a and, starting from the latter, contains the connection to the reserve container 3, if appropriate a third valve 46, and leads to the driving nozzle 44b of the ejector pump 44. During normal operation, the second valve 45 is closed and the first branch 42a of the collecting line is connected via the open nonreturn valve 43 to the second branch 42b. From the latter, the compressed gas passes through the ejector pump 44 to the consumer 5. In the reserve mode, the second valve 45 is open and, because of the greater pressure in the second branch 42b, the nonreturn valve 43 remains closed, and therefore the contents of the reserve container 3 flow through the second branch 42d into the ejector pump 44 and thus suck up gas from the first branch 42a and therefore from the compressed gas containers 1, 2.

Furthermore, an emergency discharge valve 50 and a repair discharge valve 51, by means of which the system can be emptied for the corresponding purpose, is connected to the second branch 42b. Downstream of the ejector pump 44, a sensor 52 is fitted to the collecting line 42 and measures the pressure prevailing there and the temperature and indicates them to the control unit 10 via a line 53. Furthermore, sensors of this type for pressure and temperature 54, 55, 56 are fitted to the compressed gas containers 1, 2 and to the reserve container 3 and provide measurement data to the control unit 10 via the lines which are denoted collectively by 57. A further signal line 58 is indicated by dashed lines and by 58, said signal line, if appropriate, supplying further operating data or measured variables from the consumer 5 to the control unit 10.

By suitable activation of the cyclically controlled valves 7, 8, the control unit 10, on the basis of the data converging there, is also able to switch over the removal during normal operation from one container 1 to the other container 2 and to switch over to the reserve mode.

In the exemplary embodiment shown, a plurality of valves (7, 8, 9, 45, 46, 50, 51) are combined to form a valve block 63 which also contains the branches 42a, 42b of the collecting line, the nonreturn valve 43 and, if appropriate, also the ejector pump 44. Said valve block 63 is supplied over a short distance with the activation signals for the controllable valves, which is indicated merely by an arrow 64. Finally, the control unit 10 can also be connected to a display 65 which gives the mechanic or driver of the motor vehicle information about the filling level of the compressed gas containers and further information.

Within the scope of the invention, further embodiments are conceivable, as are combinations of the features of the four exemplary embodiments described. The consumer 5 has not been described, since the system according to the invention can be used for all conceivable consumers, in particular internal combustion engines, with all conceivable mixture formation methods. They can be realized with a corresponding design of the valves and of the ejector pump.

The invention claimed is:

1. A system for supplying a consumer with gaseous fuel, with at least one compressed gas container which is connected in terms of flow to the consumer via a collecting line and valves, wherein a reserve container is connected to the collecting line via a first valve, and wherein an ejector pump is provided, the ejector pump being operated with gas from the reserve container and feeding gas from the at least one compressed gas container into the collecting line, for which purpose the ejector pump is arranged, with regard to the flow, between the at least one compressed gas container and the consumer, and wherein a nonreturn valve is arranged in the collecting line between the at least one compressed gas container and the location where the gas coming from the reserve container opens out, said nonreturn valve preventing flow from the reserve container to the at least one compressed gas container.

2. The system as claimed in claim 1, wherein the ejector pump comprises a feed duct and a driving nozzle arranged therein, wherein the collecting line in the ejector pump forms the feed duct, and the reserve container is connected in terms of flow to the driving nozzle.

3. The system as claimed in claim 2, wherein the collecting line is branched at a point upstream of the ejector pump into two branches forming a loop, the first branch between the at least one compressed gas container and the ejector pump containing the nonreturn valve, and the second branch containing a second valve.

4. The system as claimed in claim 2, wherein the collecting line has two branches, the first of which forms the feed duct in the ejector pump and the second of which opens into the driving nozzle, the first branch between the at least one compressed gas container and the ejector pump having the nonreturn valve and a second valve, and the compressed gas containers being connected between the nonreturn valve and the second valve to the collecting line.

5. The system as claimed in claim 1, wherein a bypass line in the ejector pump forms the feed duct, and the reserve container is connected in terms of flow to the driving nozzle, the bypass line branching off at a first point of the collecting line between the at least one container and the nonreturn valve and being reunited with the collecting line at a second point located between the nonreturn valve and the consumer, and a further nonreturn valve being arranged between the first point and the ejector pump.

6. The system as claimed in claim 1, wherein a plurality of containers are each connected in terms of flow to the collecting line, with a control valve which is designed as a cyclically operated valve and which, if appropriate, can be completely opened in a reserve position being present at the output of each container.

7. The system as claimed in claim 1, wherein the collecting line can be connected to an external compressed gas source via a refueling valve and contains a shut-off valve downstream of the ejector pump.

8. The system as claimed in claim 1, wherein an emergency discharge line or a repair discharge line, which each contain their own shut-off valve, branches off from the collecting line.

9. The system as claimed in claim 1, wherein the valves are combined in a valve block which also contains at least part of the collecting line.

10. The system as claimed in claim 1, wherein the reserve tank is separate from the at least one container.

11. The system as claimed in claim 1, wherein the at least one container and the reserve tank are communicated to the consumer along a single collecting line.

12. The system as claimed in claim 1, wherein the ejector pump comprises a feed duct and a driving nozzle having a driving fluid inlet arranged therein, wherein the collecting line connects to the feed duct of the ejector pump, and wherein the reserve container is connected in terms of flow to the driving fluid inlet of the driving nozzle, and wherein the collecting line is branched at a point upstream of the ejector pump into two branches forming a loop, the first branch being connected between the at least one compressed gas container and the feed duct of the ejector pump and containing the nonreturn valve, and the second branch also being connected between the at least one compressed gas container and the feed duct of the ejector pump and containing a second valve.

13. A method for removing gaseous fuel from at least one compressed gas container which is connected in terms of flow to the consumer via a collecting line and valves, wherein when the pressure in the collecting line drops below a threshold value, gaseous fuel is removed from a reserve container and supplied to the collecting line via an ejector pump, with the at least one compressed gas container being largely emptied, wherein a nonreturn valve is arranged in the collecting line between the at least one compressed gas container and the location where the gas coming from the reserve container opens out, said nonreturn valve preventing flow from the reserve container to the at least one compressed gas container.

* * * * *